United States Patent
Goto

(10) Patent No.: US 11,433,653 B2
(45) Date of Patent: Sep. 6, 2022

(54) PACKAGING BAG USING POLYBUTYLENE TEREPHTHALATE FILM

(71) Applicant: TOYOBO CO., LTD., Osaka (JP)

(72) Inventor: Takamichi Goto, Inuyama (JP)

(73) Assignee: TOYOBO CO., LTD., Osaka (JP)

( * ) Notice: Subject to any disclaimer, the term of this patent is extended or adjusted under 35 U.S.C. 154(b) by 215 days.

(21) Appl. No.: 16/633,571

(22) PCT Filed: Jul. 3, 2018

(86) PCT No.: PCT/JP2018/025169
§ 371 (c)(1),
(2) Date: Jan. 23, 2020

(87) PCT Pub. No.: WO2019/021759
PCT Pub. Date: Jan. 31, 2019

(65) Prior Publication Data
US 2020/0156359 A1    May 21, 2020

(30) Foreign Application Priority Data

Jul. 26, 2017    (JP) .............................. JP2017-144624
Dec. 12, 2017    (JP) .............................. JP2017-237409

(51) Int. Cl.
*B32B 27/32*    (2006.01)
*B32B 27/36*    (2006.01)
(Continued)

(52) U.S. Cl.
CPC .............. *B32B 27/32* (2013.01); *B32B 27/36* (2013.01); *B32B 37/15* (2013.01); *B65D 65/40* (2013.01);
(Continued)

(58) Field of Classification Search
CPC .... B65D 81/3461; B65D 65/40; B32B 27/36; B32B 2307/736; B32B 2439/46;
(Continued)

(56) References Cited

U.S. PATENT DOCUMENTS 5,085,904 A * 2/1992 Deak ........................ B32B 37/12
427/571
2012/0225273 A1* 9/2012 Nomura .............. C08L 23/0815
428/220
(Continued)

FOREIGN PATENT DOCUMENTS

EP        3406421 A1    11/2018
JP    H06-278240 A    10/1994
(Continued)

OTHER PUBLICATIONS

Japanese Patent Office, International Preliminary Report on Patentability in International Patent Application No. PCT/JP2018/025169 (dated Jan. 28, 2020).
(Continued)

*Primary Examiner* — Lee E Sanderson
(74) *Attorney, Agent, or Firm* — Leydig, Voit & Mayer, Ltd.

(57) ABSTRACT

It is an object of the present invention to provide a packaging bag having excellent dimensional stability, processability, bag breakage resistance, and chemical resistance, and causing less transfer of an extract to contents. A packaging bag includes a laminated body in which a layer of biaxially stretched polybutylene terephthalate film, having a thickness of 8 to 25 μm and a polyolefin film sealant layer having a thickness of 10 to 100 μm are laminated. The biaxially stretched polybutylene terephthalate film satisfies (a) to (c) below: (a) the biaxially stretched polybutylene terephthalate film contains 60% by mass or more of a polybutylene terephthalate resin; (b) a thermal shrinkage of the biaxially
(Continued)

stretched polybutylene terephthalate film at 150° C. for 30 minutes is −2 to +4%; and (c) a total amount of 1,4-butanediol and THF volatilized during heating at a temperature of 135° C. for 60 minutes is 2000 ppb or less.

6 Claims, 1 Drawing Sheet

(51) Int. Cl.
    *B32B 37/15*     (2006.01)
    *B65D 65/40*     (2006.01)

(52) U.S. Cl.
    CPC . *B32B 2262/0284* (2013.01); *B32B 2309/105* (2013.01); *B32B 2310/0862* (2013.01)

(58) Field of Classification Search
    CPC .......... B32B 2307/518; B32B 2307/76; B32B 27/12; B32B 27/16; B32B 27/40; B32B 15/08; B32B 15/20; B32B 7/12; B32B 2439/70; B32B 2262/0284; C08L 67/02; C08L 67/03; C08L 67/04; C08L 23/0815
    USPC ................................. 428/35.8, 35.9
    See application file for complete search history.

(56) References Cited

U.S. PATENT DOCUMENTS

| | | | | |
|---|---|---|---|---|
| 2013/0139883 | A1* | 6/2013 | Togawa | H01L 31/0481 136/256 |
| 2013/0196099 | A1 | 8/2013 | Sakamoto et al. | |
| 2013/0260144 | A1* | 10/2013 | Yamazaki | C09D 133/14 428/336 |
| 2015/0299406 | A1* | 10/2015 | Gotou | C08J 5/18 525/444 |
| 2016/0272771 | A1* | 9/2016 | Goto | B32B 27/18 |
| 2018/0037002 | A1 | 2/2018 | Yamazaki et al. | |
| 2018/0099451 | A1 | 4/2018 | Goto et al. | |
| 2018/0099494 | A1 | 4/2018 | Goto et al. | |

FOREIGN PATENT DOCUMENTS

| | | | |
|---|---|---|---|
| JP | H08-311212 A | 11/1996 | |
| JP | 2002-067213 A | 3/2002 | |
| JP | 2002067213 A * | 3/2002 | |
| JP | 2009197099 A * | 9/2009 | |
| JP | 4857482 B2 | 11/2011 | |
| JP | 2012-214248 A | 11/2012 | |
| JP | 2013-154605 A | 8/2013 | |
| JP | 2018-020844 A | 2/2018 | |
| WO | WO-2015072163 A1 * | 5/2015 | ............ B32B 27/36 |
| WO | WO 2016/136768 A1 | 9/2016 | |
| WO | WO 2016/171172 A1 | 10/2016 | |
| WO | WO 2016/171173 A1 | 10/2016 | |
| WO | WO 2017/126563 A1 | 7/2017 | |

OTHER PUBLICATIONS

China National Intellectual Property Administration, The First Office Action in Chinese Patent Application No. 201880048519.3 (dated Mar. 31, 2021).
Sato et al., "Depolymerization of Poly(butylene terephthalate) into Terephthalic Acid and Tetrahydrofuran in High-temperature Liquid Water," *Chem. Lett.*, 44: 1312-1314 (2015).
Japanese Patent Office, International Search Report in International Patent Application No. PCT/JP2018/025169 (dated Sep. 18, 2018).
European Patent Office, Extended European Search Report in European Patent Application No. 18838368.1 (dated Jun. 16, 2020).
Japanese Patent Office, Notice of Reasons for Refusal in Japanese Patent Application No. 2019-532468 (dated Jun. 22, 2021).
Indian Patent Office, Examination Report in Indian Patent Application No. 202047007088 (dated Dec. 23, 2021).

* cited by examiner

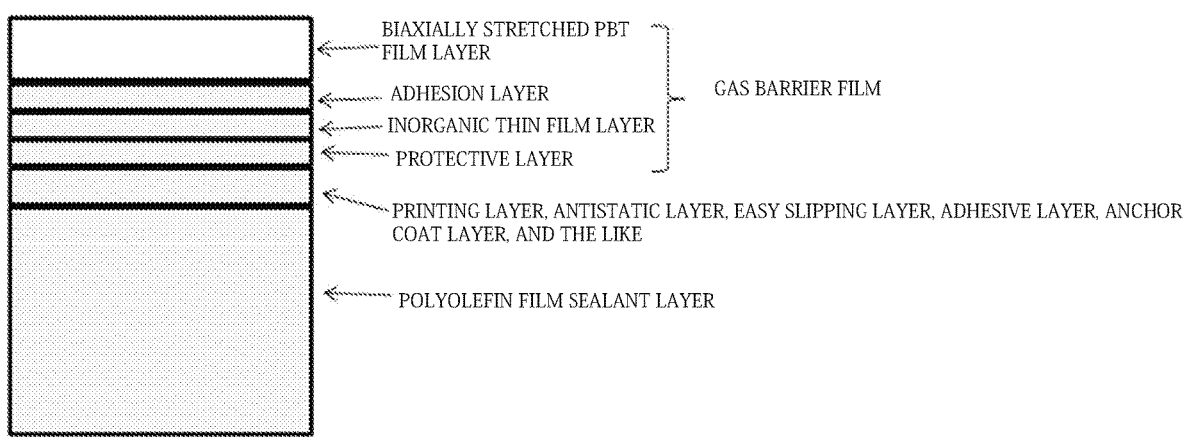

PACKAGING BAG USING POLYBUTYLENE TEREPHTHALATE FILM

CROSS-REFERENCE TO RELATED APPLICATIONS

This patent application is the U.S. national phase of International Patent Application No. PCT/JP2018/025169, filed Jul. 3, 2018, which claims the benefit of Japanese Patent Application No. 2017-144624, filed on Jul. 26, 2017, and Japanese Patent Application No. 2017-237409, filed on Dec. 12, 2017, which are incorporated by reference in their entireties herein.

TECHNICAL FIELD

The present invention relates to a packaging bag including a laminated body in which a biaxially stretched polybutylene terephthalate (hereinafter abbreviated as PBT) film layer and a polyolefin film sealant layer are laminated. More specifically, the present invention relates to a packaging bag that has excellent pinhole resistance at low temperature, causes less transfer of an extract to contents after a heat treatment, and is suitable for packaging frozen foods, retorting, or heating with a microwave oven and the like.

BACKGROUND ART

In a food packaging field, packaging with plastic films has been often used. When these plastic films are utilized for packaging frozen foods and frozen materials and the like, a distribution environment is mainly a low-temperature distribution environment, and therefore, products are loaded in large amounts particularly when the products are transported. A packaging bag formed of a plastic film loses its flexibility and becomes harder and more brittle at lower temperatures, so that following problem often occurs: the shape of a product stored in the packaging bag and vibration and the like during transportation in distribution processes between production sites and consumers cause the tear of the packaging bag; or drop impact due to poor handling causes bag breakage and pinholes.

For this reason, the packaging bags containing the above-mentioned contents are required to have excellent pinhole resistance and mechanical strength. For example, as described in Patent Document 1, a film containing a polyamide resin layer is generally used. However, such a polyamide film generally has a large dimensional change during moisture absorption to cause a problem of curling during processing. The polyamide film easily absorbs moisture, and does not have good heat resistance. If a packaging bag containing food containing a liquid or solid food containing a large amount of moisture, oil, or sugar is cooked with a high-power microwave oven, the polyamide film disadvantageously melts to cause the packaging bag to be perforated when microwaves are partially concentrated to cause the polyamide film to be strongly locally heated.

Meanwhile, a technique has been proposed, in which a pouch for retort obtained by providing an inorganic oxide vapor deposition film on one surface of a laminated film including a biaxially stretched polyethylene terephthalate (hereinafter abbreviated as PET) film and a biaxially stretched polyamide film, and previously sequentially laminating a gas barrier substrate provided with a primer agent layer and a heat-sealable resin layer on the surface of the inorganic oxide vapor deposition film with a laminating adhesion layer interposed therebetween provides improved dimensional stability and bag breakage resistance (for example, Patent Document 2). However, this conventional technique disadvantageously has poor pinhole resistance.

As a method for achieving both pinhole resistance and low elution, a technique has been proposed, in which a low-cost packaging material, for boiling or retorting, having low elution and excellent transparency can be obtained by using, as a substrate layer of a transparent film having gas barrier properties, a biaxially stretched multilayer film obtained by biaxially stretching a multilayer film including a polyester resin layer and a polyamide resin layer (for example, Patent Document 3). However, since separation is apt to occur at the interface between the polyester resin layer and the polyamide resin layer, this conventional technique has a problem in that, when a bag falls, the bag is apt to be broken, resulting in leaking of contents.

As a method for solving these problems, a technique has been known, in which the use of a biaxially stretched PBT film as a base film provides a biaxially stretched PBT film that can be used even under severe retort conditions of 130° C. or higher and has excellent compression resistance, impact resistance, and hot water resistance (for example, Patent Document 4).

However, a film production method by tubular simultaneous biaxial stretching disclosed in the conventional technique has a problem in that the thickness accuracy is poorer than that of simultaneous biaxial stretching of a tenter method or a film production method of sequential biaxial stretching, and the plane orientation is not increased, so that the impact resistance is poor. When processing such as a step of applying an adhesive to a film is performed, the film is apt to stretch and thus the processability is poor. It has been known that, when the PBT resin is heated, 1,4-butanediol, that is the monomer component of PBT, and tetrahydrofuran (hereinafter abbreviated as THF) that is produced by a cyclization reaction accompanying pyrolysate of 1,4-butanediol are produced (for example, Non-Patent Document 1). Therefore, there is a problem that, when retorting or a high-temperature heat treatment with a microwave oven is performed, these low-molecular-weight components elute, resulting in deterioration of the flavor of contents (for example, Patent Document 5).

PRIOR ART DOCUMENTS

Patent Documents

Patent Document 1: JP-A-06-278240
Patent Document 2: Japanese Patent No. 4857482
Patent Document 3: JP-A-2013-154605
Patent Document 4: JP-A-2012-214248
Patent Document 5: JP-A-H08-311212

Non-Patent Document

Non-Patent Document 1: Osamu Sato et al. Chem. Lett. 2015, 44, 1312-1314

DISCLOSURE OF THE INVENTION

Problems to be Solved by the Invention

The present invention has been made in view of the problems of the conventional technique. That is, an object of the present invention is to provide a packaging bag that has excellent dimensional stability, processability, bag breakage resistance, chemical resistance, and pinhole resistance at low temperature, causes less transfer of an extract to contents after a heat treatment, and is suitable for frozen foods, retorting, or heating with a microwave oven and the like.

Means for Solving the Problems

As a result of thorough research carried out for accomplishing the above object, the present inventors have found that a packaging bag made from a laminated body in which a specific PBT film layer and a polyolefin film sealant layer are laminated can provide a packaging bag that has excellent dimensional stability, processability, bag breakage resistance, chemical resistance, and pinhole resistance at low temperature, causes less transfer of an extract to contents after a heat treatment, and is suitable for frozen foods, vacuum packaging, retorting, or heating with a microwave oven and the like. Then, the present inventors have completed the present invention.

That is, the present invention has the configurations described below.

(1) A packaging bag including a laminated body in which at least a layer of biaxially stretched polybutylene terephthalate film having a thickness of 8 to 25 µm and a polyolefin film sealant layer having a thickness of 10 to 100 µm are laminated, wherein the biaxially stretched polybutylene terephthalate film satisfies (a) to (c) below:

(a) the biaxially stretched polybutylene terephthalate film contains 60% by mass or more of a polybutylene terephthalate resin;

(b) a thermal shrinkage of the biaxially stretched polybutylene terephthalate film after heating at 150° C. for 30 minutes is −2 to +4%; and (c) a total amount of 1,4-butanediol and tetrahydrofuran volatilized during heating at a temperature of 135° C. for 60 minutes is 2000 ppb or less.

(2) The packaging bag according to (1), wherein the packaging bag includes the laminated body in which a gas barrier film and the polyolefin film sealant layer are laminated, and the gas barrier film is obtained by sequentially laminating the layer of biaxially stretched polybutylene terephthalate film, an adhesion layer, an inorganic thin film layer, and a protective layer.

(3) The packaging bag according to (1) or (2), wherein a biaxially stretched polyethylene terephthalate film is laminated on a surface opposite to a polyolefin film sealant layer side of the layer of biaxially stretched polybutylene terephthalate film.

(4) The packaging bag according to any one of (1) to (3), wherein the polyolefin film sealant layer contains 30 to 80% by mass of low density polyethylene and 20 to 70% by mass of polylactic acid.

(5) The packaging bag according to any one of (1) to (4), wherein the packaging bag is used for retort.

(6) The packaging bag according to any one of (1) to (4), wherein the packaging bag is used for heating with a microwave oven.

(7) The packaging bag according to any one of claims 1 to 4, wherein the packaging bag is used for vacuum packaging.

(8) The packaging bag according to any one of (1) to (7), wherein the packaging bag is a pillow packaging bag.

Effect of the Invention

The present invention can provide a packaging bag that has excellent dimensional stability, processability, bag breakage resistance, chemical resistance, and pinhole resistance at low temperature, causes less transfer of an extract to contents after a heat treatment, and is suitable for retorting, heating with a microwave oven, vacuum packaging, or frozen foods.

BRIEF DESCRIPTION OF THE DRAWINGS

FIG. 1 is a schematic cross-sectional view of a laminated body in which a polyolefin sealant layer is laminated on a typical laminated gas barrier film.

MODE FOR CARRYING OUT THE INVENTION

Hereinafter, the present invention will be described in detail.

[Packaging Bag]

A packaging bag of the present invention includes a laminated body in which a gas barrier film and a polyolefin film sealant layer having a thickness of 10 to 100 µm are laminated. The gas barrier film is obtained by sequentially laminating a biaxially stretched polybutylene terephthalate (PBT) film layer having a thickness of 8 to 25 µm, an adhesion layer, an inorganic thin film layer, and a protective layer. In the laminated body constituting the packaging bag of the present invention, a printing layer, an antistatic layer, an easy slipping layer, an adhesive layer, and an anchor coat layer and the like may be laminated in addition to the gas barrier film obtained by sequentially laminating the biaxially stretched PBT film layer, the adhesion layer, the inorganic thin film layer, and the protective layer, and the polyolefin sealant layer, as indispensable constituent elements.

The packaging bag of the present invention is used as a packaging bag for packaging contents such as foods by bonding a polyolefin film sealant layer by a heat seal method, an impulse seal method, or an ultrasonic seal method or the like. The packaging bag of the present invention is produced by a packaging machine such as a vertical pillow type packaging machine, a vertical pillow type packaging machine, a three-way seal packaging machine, or a drawing packaging machine.

The packaging bag of the present invention can be used for vacuum packaging, gas filling packaging, heat sterilization packaging, aseptic packaging, chilled food packaging, and frozen food packaging and the like. The packaging bag of the present invention can be suitably used as a packaging bag for vacuum packaging and boil-retort pouch packaging of kneaded products, ham, sausage, hamburger, and grilled pork and the like, gas filling packaging of sausage, sauce sticks and three-way packaging, and drawn packaging of cheese, bacon, and ham. The packaging bag of the present invention causes less transfer of an extract to contents after a heat treatment, and can prevent local heating caused by microwaves from perforating the packaging bag during heating with a microwave oven, whereby the packaging bag is particularly suitable as a packaging bag for retort and a packaging bag for heating with a microwave oven.

Hereinafter, each layer of the gas barrier film in which the biaxially stretched PBT film layer, the adhesion layer, the inorganic thin film layer, and the protective layer are sequentially laminated in the present invention, and the polyolefin film sealant layer laminated on the gas barrier film will be described.

[Biaxially Stretched PBT Film Layer]

The biaxially stretched PBT film layer used in the present invention contains 60% by mass or more of a PBT resin. When the content of the PBT resin is less than 60% by mass, the characteristics of the biaxially stretched PBT film such as excellent bag breakage resistance, chemical resistance, and pinhole resistance at low temperature are lost. The biaxially stretched PBT film layer used in the present invention can contain other resins and additives as long as the amount of the PBT resin is not less than 60% by mass. In the PBT resin in the present invention, a dicarboxylic acid component is preferably 90 mol % or more of terephthalic acid, more preferably 95 mol % or more, still more preferably 98 mol % or more, and most preferably 100 mol %. A glycol component is preferably 90 mol % or more of 1,4-butanediol, more preferably 95 mol % or more, and still more preferably 97 mol % or more. The PBT resin used in the present invention may be copolymerized within the above range. However, the biaxially stretched PBT film layer in the present invention needs to contain 604 by mass or more of a PBT repeating unit.

Examples of components copolymerized with the PBT resin include dicarboxylic acids such as isophthalic acid, orthophthalic acid, naphthalenedicarboxylic acid, biphenyldicarboxylic acid, cyclohexanedicarboxylic acid, adipic acid, azelaic acid, and sebacic acid, and diol components such as ethylene glycol, 1,3-propylene glycol, 1,2-propylene glycol, neopentyl glycol, 1,5-pentanediol, 1,6-hexanediol, diethylene glycol, cyclohexanediol, polyethylene glycol, polytetramethylene glycol, and polycarbonate diol.

The biaxially stretched PBT film layer used in the present invention can contain a polyester resin other than the PBT resin for the purpose of adjusting the film formability during biaxial stretching and the mechanical characteristic of a film to be obtained. Examples of the polyester resin other than the PBT resin include PET and polyethylene naphthalate. The polyester resin other than the PBT resin may be copolymerized. Examples of components copolymerized with a PET resin include dicarboxylic acids such as isophthalic acid, orthophthalic acid, naphthalenedicarboxylic acid, biphenyldicarboxylic acid, cyclohexanedicarboxylic acid, adipic acid, azelaic acid, and sebacic acid, and diol components such as ethylene glycol, 1,3-propylene glycol, 1,2-propylene glycol, neopentyl glycol, 1,5-pentanediol, 1,6-hexanediol, diethylene glycol, cyclohexanediol, polyethylene glycol, polytetramethylene glycol, and polycarbonate diol.

The lower limit of the intrinsic viscosity of the PBT resin used in the present invention is preferably 0.9 dl/g, more preferably 0.95 dl/g, and still more preferably 1.0 dl/g. If the intrinsic viscosity of the PBT resin is less than 0.9 dl/g, the intrinsic viscosity of the film obtained by film production may be lowered, and the piercing strength, the impact strength, and the bag breakage resistance and the like may be deteriorated. The upper limit of the intrinsic viscosity of the PBT resin is preferably 1.3 dl/g. If the intrinsic viscosity of the PBT resin exceeds the above value, the stress during stretching may become too high and the film formability may be deteriorated. Furthermore, the melt viscosity of the PBT resin increases. Thus, it is necessary to set the extrusion temperature to a high temperature, which makes the decomposition products be likely to be produced when the PBT resin is extruded.

The lower limit of the intrinsic viscosity of the polyester resin other than the PBT resin used in the present invention is preferably 0.5 dl/g, and more preferably 0.6 dl/g if the PET resin is used. If the intrinsic viscosity of the polyester resin other than the PBT resin is less than 0.5 dl/g, the intrinsic viscosity of the film obtained by film production may be lowered, and the piercing strength, the impact strength, and the bag breakage resistance and the like may be deteriorated. The upper limit of the intrinsic viscosity of the polyester resin other than the PBT resin is preferably 1.2 dl/g if the PET resin is used. If the intrinsic viscosity of the PET resin exceeds the above value, the stress during stretching may become too high and the film formability may be deteriorated. Furthermore, the melt viscosity of the PET resin increases. Thus, it is necessary to set the extrusion temperature to a high temperature, which makes the decomposition products be likely to be produced when the PET resin is extruded.

For the purpose of reducing effluents after retorting of the packaging bag of the present invention, it is effective to add an antioxidant to the biaxially stretched PBT film layer. In a step of extruding the resin, a decrease in the molecular weight of the resin is suppressed. This is because the amount of low-molecular-weight components such as 1,4-butanediol and THF remaining in the obtained film is reduced. The decomposition of PBT gradually proceeds by heating, and thus the addition of an antioxidant is effective for suppressing pyrolysis that occurs when a film is subjected to retorting.

Examples of the antioxidant used in the biaxially stretched PBT film layer in the present invention include a primary antioxidant (having a radical scavenging or chain terminating effect, for example, phenol-based antioxidants or amine-based antioxidants) and a secondary antioxidant (having a peroxide decomposing effect, for example, phosphorus-based antioxidants, sulfur-based antioxidants, or the like), and any of these antioxidants can be used. Specific examples thereof include phenol-based antioxidants (for example, phenol type, bisphenol type, thiobis phenol type, polyphenol type or the like), amine-based antioxidants (for example, diphenylamine type, quinoline type or the like), phosphorus-based antioxidants (for example, phosphite type, phosphonite type or the like), and sulfur-based antioxidants (for example, thiodipropionic acid ester type or the like). Specific examples thereof include n-octadecyl-β-(4'-hydroxy-3,5'-di-t-buthylphenyl)propionate, tetrakis[methylene-3-(3',5'-di-t-butyl-4'-hydroxyphenyl)propionate] (commercially available as "Irganox 1010" (trade name)), 1,1,3-tris(2-methyl-4-hydroxy-5-t-buthylphenyl)butane, 1,3,5-tris(3,5-di-t-butyl-4-hydroxybenzyl)-S-triazine-2,4,6(1H,3H,5H)-trione, 1,3,5-trimethyl-2,4,6-tris(3,5-di-t-butyl-4-hydroxybenzyl)benzene (commercially available as "Irganox 1330" (trade name)), tris(mixed mononylphenyl and/or dinonylphenyl)phosphite, cyclic neopentane tetrailbis(oetadeeylphosphite), tris(2,4-di-t-buthylphenylphosphite), 2,2-methylene bis(4,6-di-t-butylphenyl)oetyl phosphite, di-lauryl-thiodipropionate, di-myristyl-thiodipropionate, and di-stearyl-thiodipropionate. These antioxidants may be used alone or in combination of two or more. Among these, from the viewpoint of availability and food hygiene, tetrakis[methylene-3-(3',5'-di-t-butyl-4'-hydroxyphenyl)propionate] (Irganox 1010) is preferable.

The upper limit of the concentration of the antioxidant is preferably 2000 ppm, and more preferably 1000 ppm. If the concentration of the antioxidant exceeds the upper limit, the effect may be saturated, and the antioxidant may be deposited on the surface of the film to cause deteriorated transparency.

The biaxially stretched PBT film layer in the present invention may contain, as necessary, conventionally known additives, for example, a lubricant, a stabilizer, a coloring agent, an antistatic agent, and an ultraviolet absorber.

Examples of the lubricant include inorganic particle lubricants such as silica, calcium carbonate, and alumina, and organic lubricants. Silica and calcium carbonate are preferable, and porous silica is particularly preferable from the viewpoint of reducing haze. These lubricants can exhibit transparency and slippage.

The lower limit of the concentration of the lubricant is preferably 100 ppm, more preferably 500 ppm, and still more preferably 800 ppm. If the concentration of the lubricant is less than the above value, the slippage of the film tends to be deteriorated. The upper limit of the concentration of the lubricant is preferably 20000 ppm, more preferably 10000 ppm, and still more preferably 1800 ppm. If the concentration of the lubricant exceeds the above value, the transparency tends to be deteriorated.

A production method for providing the biaxially stretched PBT film layer in the present invention will be specifically described. The production method is not limited thereto. The biaxially stretched PBT film layer in the present invention is obtained by melt-extruding a raw material resin from a die, casting the melt-extruded product onto a cooling roll to obtain an un-stretched sheet, biaxially stretching the un-stretched sheet, and thereafter thermo-setting the biaxially stretched sheet, followed by winding up in a roll form. Each step will be described in more detail.

First, the lower limit of the temperature for melting a raw material resin mainly composed of the PBT resin is preferably 200° C., more preferably 250° C., and still more preferably 260° C. If the temperature is lower than the above value, discharge may become unstable. The upper limit of the temperature for melting the raw material resin is preferably 280° C., and more preferably 270° C. If the temperature exceeds the above value, the decomposition of the resin proceeds, resulting in an increase in the amount of low-molecular-weight components such as 1,4-butanediol and THF remaining in the biaxially stretched PBT film. Next, it is necessary to reduce the difference in degree of crystallinity in the transverse direction when extruding the melted polyester resin, and casting the polyester resin onto the cooling roll. Examples of a specific method therefor include a method in which raw materials having the same composition are multi-layered to form a multi-layer laminated body, and the multi-layer laminated body is then cast. Examples thereof include lowering the temperature of the cooling roll.

PBT has a high crystallization rate, and thus the crystallization of PBT proceeds during casting. At this time, if PBT is cast in the form of a single layer structure in place of a multi-layer structure, there is no barrier that can suppress the growth of crystals of PBT, and therefore the crystals grow into large-sized spherulites. As a result, the yield stress of the obtained un-stretched sheet increases, and therefore, the un-stretched sheet is easily broken during biaxial stretching. In addition, the flexibility of the obtained biaxially stretched film is deteriorated, resulting in the insufficiency of the pinhole resistance and bag breakage resistance of the film. Meanwhile, by laminating the same resins to form a multi-layer laminated body, the stretching stress of the un-stretched sheet can be reduced, whereby stable biaxial stretching can be achieved. In addition, a structure in which 1,4-butanediol and THF are easily removed in a heat treatment step that is a step after biaxial stretching is formed.

As a specific method for forming a multi-layer structure, a conventional multi-layering apparatus (a multi-layer feed block, a static mixer, and a multi-layer multimanifold and the like) can be used. For example, a method in which a thermoplastic resin that is sent out from different flow paths using at least two extruders is laminated into a multi-layer sheet with a feed block, a static mixer, or a multimanifold die or the like can be used. When a thermoplastic resin is formed into multiple layers having the same composition as described in the present invention, the purpose of the present invention can also be achieved by using only a single extruder and installing the above-mentioned multi-layering apparatus into a melt line located between the extruder and a die.

The lower limit of the temperature of the cooling roll is preferably −10° C. If the temperature of the cooling roll is lower than the above value, the crystallization suppressing effect is saturated. The surface of the cooling roll may be apt to cause dew formation, which causes difficult operation. The upper limit of the temperature of the cooling roll is preferably 40° C. If the temperature of the cooling roll exceeds the above value, the degree of crystallinity tends to become excessively high, which causes difficult biaxial stretching. When the temperature of the cooling roll is set within the above range, it is preferable to decrease the humidity in the environment around the cooling roll to prevent dew formation.

In the casting, the resin with high temperature is brought into contact with the surface, and thus the temperature of the cooling roll surface increases. Normally, the cooling roll is cooled by causing cooling water to flow through a pipe that is installed in the cooling roll. In such a case, it is necessary to eliminate the temperature difference in the transverse direction of the cooling roll surface by ensuring a sufficient amount of cooling water, devising the arrangement of the pipe, carrying out maintenance such that sludge is prevented from adhering to the pipe, etc. At this time, the thickness of the un-stretched sheet is suitable in a range of 15 to 2500 μm.

The above-described casting with the multi-layer structure is performed in at least 60 or more layers, preferably 250 or more layers, and still more preferably 1000 or more layers. If the number of layers is small, the effect of improving stretchability is lost.

Next, a stretching method will be described. The stretching method can be either simultaneous biaxial stretching or sequential biaxial stretching. For increasing piercing strength, it is necessary to increase a plane orientation coefficient, and sequential biaxial stretching is most preferable from the viewpoint that the film forming speed can be increased to provide high productivity. As a sequential biaxial stretching device, a normal machine roll stretching machine and a tenter stretching machine that performs transverse stretching and thermo-setting can be used.

Furthermore, a sequential biaxial stretching method will be described. The lower limit of the stretching temperature in the mechanical stretching direction (hereinafter, abbreviated as MD direction) is preferably 55° C., and more preferably 60° C. If the temperature is less than 55° C., film-breaking tends to easily occur. The orientation in the MD direction becomes too strong due to stretching at low temperature, so that the shrinkage stress during a thermo-setting treatment increases, and thus the distortion of molecular orientation in the transverse direction increases, consequently, linear tear properties in the longitudinal direction may be deteriorated. The upper limit of the stretching temperature in the MD direction is preferably 100° C., and more preferably 95° C. If the temperature exceeds 100° C., mechanical characteristics may be deteriorated since no orientation is applied to the film.

The lower limit of the stretching ratio in the MD direction is preferably 2.6 times, and particularly preferably 2.8 times. If the stretching ratio in the MD direction is less than the above value, mechanical characteristics and thickness unevenness may be deteriorated since less orientation is applied to the film. The upper limit of the MD stretching ratio is preferably 4.3 times, more preferably 4.0 times, and particularly preferably 3.8 times. When the MD stretching ratio exceeds the above value, the effect of improving the mechanical strength and thickness unevenness may be saturated. The orientation in the MD direction becomes too strong, so that the shrinkage stress during the thermo-setting treatment increases, and thus the distortion of molecular orientation in the transverse direction increases. Consequently, linear tear properties in the longitudinal direction may be deteriorated.

The lower limit of the stretching temperature in the transverse stretching direction (hereinafter, abbreviated as TD direction) is preferably 60° C., and if the temperature is less than the above value, film-breaking may easily occur. The upper limit of the stretching temperature in the TD direction is preferably 100° C., and if the temperature exceeds the above value, mechanical characteristics may be deteriorated since no orientation is applied to the film.

The lower limit of the stretching ratio in the TD direction is preferably 3.5 times, more preferably 3.6 times, and particularly preferably 3.7 times. If the stretching ratio in the TD direction is less than the above value, mechanical characteristics and thickness unevenness may be deteriorated since less orientation is applied to the film. The upper limit of the stretching ratio in the TD direction is preferably 5 times, more preferably 4.5 times, and particularly preferably 4.0 times. When the MD stretching ratio exceeds the above value, the effect of improving the mechanical strength and thickness unevenness may be saturated.

The lower limit of the thermo-setting temperature is preferably 200° C., and more preferably 205° C. If the thermo-setting temperature is lower than the above value, a thermal shrinkage rate may become large and deviation or shrinkage during processing may occur. Low-molecular-weight components such as 1,4-butanediol and THF produced through pyrolysis of the PBT resin and copolymerized polyester resin in the resin melt-extruding step may remain in the biaxially stretched PBT film, and may transfer to contents in a packaging material due to heating such as retorting, resulting in deterioration of the flavor of food. The upper limit of the thermo-setting temperature is preferably 240° C. If the thermo-setting temperature exceeds the above value, the film may melt, or even when the film does not melt, the film may become extremely brittle.

A relaxation treatment may be performed in the TD direction after thermo-setting or simultaneously. The lower limit of the relaxation rate in the TD direction is preferably 0.5%, more preferably 1%, and most preferably 3%. If the relaxation rate in the TD direction is less than the above value, the thermal shrinkage rate may increase. Film-breaking may easily occur during thermo-setting. The upper limit of the relaxation rate in the TD direction is preferably 10%, more preferably 9%, and most preferably 7%. If the relaxation rate exceeds the above value, sagging and the like may occur, which causes thickness unevenness. In addition, the shrinkage in the longitudinal direction during thermo-setting may increase, resulting in increased distortion of molecular orientation in an end part to cause deteriorated linear tear properties.

The PBT film in the present invention may be subjected to a corona treatment or a flame treatment or the like. By subjecting the PBT film to the corona treatment or the flame treatment or the like, the wettability of the surface of the film and the adhesion of the film with the adjacent layer can be improved.

The lower limit of the thickness of the biaxially stretched PBT film layer in the present invention is preferably 8 µm, more preferably 10 µm, and still more preferably 12 µm. If the thickness of the biaxially stretched PBT film layer is less than 8 µm, the strength as a film may be insufficient. The upper limit of the film thickness is preferably 25 µm, more preferably 18 µm, and still more preferably 16 µm. If the film thickness exceeds 25 µm, the film becomes too thick, which is economically disadvantageous, and processability and productivity during bag making may be deteriorated.

In the present invention, the total amount of 1,4-butanediol and THF volatilized during heating of the biaxially stretched PBT film layer at a temperature of 135° C. for 60 minutes is 2000 ppb or less. The total amount is preferably 1800 ppb, and more preferably 1500 ppb or less. By setting the total amount of 1,4-butanediol and THF that evaporate to 2000 ppb or less, transfer of 1,4-butanediol and THF to contents after retorting can be reduced, and thus change in the flavor of the contents can be suppressed. At this time, the amount of 1,4-butanediol that evaporates during heating at a temperature of 135° C. for 60 minutes is preferably 1800 ppb or less, and more preferably 1600 ppb or less. The amount of THF that evaporates during heating at a temperature of 135° C. for 60 minutes is preferably 200 ppb or less, more preferably 100 ppb, and most preferably 70 ppb or less.

The upper limit of the orientation axis angle of the biaxially stretched PBT film layer in the present invention is preferably 300, more preferably 280, and still more preferably 25°. If the orientation axis angle is less than the above value, the linear tear properties when the film is torn in the longitudinal direction thereof may be deteriorated.

In the present invention, the lower limit of the refractive index of the biaxially stretched PBT film layer in the longitudinal direction is preferably 1.610, more preferably 1.612, and still more preferably 1.613. If the refractive index is less than the above value, the orientation is weak, and thus sufficient strength as a film cannot be obtained and the bag breakage resistance may be deteriorated.

In the present invention, the upper limit of the refractive index of the biaxially stretched PBT film layer in the longitudinal direction is preferably 1.640, more preferably 1.635, and still more preferably 1.630. If the refractive index exceeds the above value, the effects of film mechanical characteristics and linear tear properties may be saturated.

In the present invention, the lower limit of the refractive index of the biaxially stretched PBT film layer in the transverse direction is preferably 1.649, more preferably 1.650, and still more preferably 1.651. If the refractive index is less than the above value, the orientation is weak, and thus sufficient strength as a film cannot be obtained and the bag breakage resistance of the packaging bag may be deteriorated. In the present invention, the upper limit of the refractive index of the biaxially stretched PBT film layer in the longitudinal direction is preferably 1.670, more preferably 1.669, and still more preferably 1.668. If the refractive index exceeds the above value, the effects of film mechanical characteristics and linear tear properties may be saturated.

In the present invention, the lower limit of the impact strength of the biaxially stretched PBT film layer is preferably 0.05 J/µm. If the impact strength is less than the above value, the strength of the packaging bag may become insufficient. In the present invention, the upper limit of the impact strength of the biaxially stretched PBT film layer is preferably 0.2 J/µm. If the impact strength exceeds the above value, the improvement effect may be saturated.

The upper limit of the haze per thickness of the biaxially stretched PBT film layer is preferably 0.66%/µm, more preferably 0.60%/µm, and still more preferably 0.53%/µm.

If the haze exceeds the above value, when the biaxially stretched PBT film layer is subjected to printing, there is a possibility that the quality of printed characters and images is impaired.

In the present invention, the lower limit of the thermal shrinkage, after heating at 150° C. for 30 minutes, of the biaxially stretched PBT film layer in the MD direction and the TD direction is preferably −2.0%, more preferably −1.0%, and still more preferably 0%. If the thermal shrinkage is less than the above value, the improvement effect may be saturated, and the film may become mechanically brittle.

In the present invention, the upper limit of the thermal shrinkage, after heating at 150° C. for 30 minutes, of the biaxially stretched PBT film layer in the MD direction and the TD direction is preferably +4.0%, more preferably 3.0%, and still more preferably 2.5%. If the thermal shrinkage exceeds the above value, pitch deviation and the like may occur due to dimensional change during processing such as printing. Generally, the thermal shrinkage of a film is adjusted on the basis of a TD relaxation rate and a treatment temperature in TD thermo-setting treatment. If the thermal shrinkage in the MD direction is more than 2%, it indicates that the TD thermo-setting treatment is insufficient. In such a film, there is a possibility that the amount of 1,4-butanediol and THF remaining in the film cannot be sufficiently reduced, so that the flavor or the like of contents of the packaging bag is deteriorated.

(Adhesion Layer)

An adhesion layer is provided between the biaxially stretched PBT film layer and the inorganic thin film layer for the purpose of ensuring laminate strength and gas barrier properties after retorting. Examples of the resin used as the adhesion layer provided between the biaxially stretched PBT film layer and the inorganic thin film layer include resins obtained by adding curing agents such as epoxy-based curing agents, isocyanate-based curing agents, and melamine-based curing agents to resins such as urethane-based resins, polyester-based resins, acrylic-based resins, titanium-based resins, isocyanate-based resins, imine-based resins, and polybutadiene-based resins.

When the adhesion layer in the present invention is formed by coating, examples of the solvating medium (solvent) of the resin include aromatic solvents such as benzene and toluene; alcohol-based solvents such as methanol and ethanol; ketone-based solvents such as acetone and methyl ethyl ketone; ester-based solvents such as ethyl acetate and butyl acetate; and polyhydric alcohol derivatives such as ethylene glycol monomethyl ether. Resin compositions used for these adhesion layers and containing a resin and a solvent preferably contain a silane coupling agent having at least one or more organic functional groups. Examples of the organic functional groups include an alkoxy group, an amino group, an epoxy group, and an isocyanate group. By the addition of the silane coupling agent, the laminate strength after retorting is further improved.

Among the resin compositions used for the adhesion layer in the present invention, a mixture of an acrylic-based resin, a urethane-based resin, and a resin containing an oxazoline group is preferably used. The oxazoline group has high affinity with the inorganic thin film, and can react with a metal hydroxide and an oxygen deficiency portion of an inorganic oxide that is generated during formation of the inorganic thin film layer, and thus firm adhesion to an inorganic thin film layer is exhibited. An unreacted oxazoline group present in an adhesion layer can react with a carboxylic acid terminal that is generated by hydrolysis of a biaxially stretched PBT film layer and the adhesion layer, thereby forming crosslinks.

The method for forming the adhesion layer is not particularly limited, and, for example, conventionally known methods such as coating methods can be adopted. Examples of suitable methods among the coating methods include an off-line coating method and an in-line coating method. For example, in the case of an in-line coating method that is executed in a step of producing a biaxially stretched PBT film, as conditions for drying and a heat treatment during coating, although depending on a coating thickness or conditions of an apparatus, it is preferable to send the biaxially stretched PBT film to a stretching step in a perpendicular direction immediately after coating and to perform drying in a pre-heating zone or a stretching zone in the stretching step. In such a case, normally, the temperature is preferably set to about 50 to 250° C.

[Inorganic Thin Film Layer]

In the present invention, an inorganic thin film layer is provided on at least a surface on which an adhesion layer is laminated, of a biaxially stretched PBT film layer, to provide excellent gas barrier properties. A thin film formed of a metal or an inorganic oxide is preferably used as the inorganic thin film layer. The material for forming the inorganic thin film layer is not particularly limited as long as the material can be made into a thin film, but from the viewpoint of gas barrier properties, inorganic oxides such as silicon oxide (silica), aluminum oxide (alumina), and mixtures of silicon oxide and aluminum oxide are preferable. In particular, a composite oxide of silicon oxide and aluminum oxide is preferable from the viewpoint that both flexibility and denseness of the thin film layer can be achieved. In this composite oxide, regarding the mixing ratio of the silicon oxide and the aluminum oxide, the metal mass ratio of Al is preferably in a range of 20 to 70%. If the Al concentration is less than 20%, the water vapor barrier properties may be deteriorated. Meanwhile, if the Al concentration exceeds 70%, the inorganic thin film layer tends to be hard, so that there is a possibility that, during secondary processing such as printing or lamination, the film is broken to cause deteriorated barrier properties. The silicon oxide as used herein is various silicon oxides such as SiO and $SiO_2$, or a mixture thereof, and the aluminum oxide as used herein is various aluminum oxides such as AlO and $Al_2O_3$, or a mixture thereof.

The film thickness of the inorganic thin film layer is normally 1 to 800 nm, and preferably 5 to 500 nm. If the film thickness of the inorganic thin film layer is less than 1 nm, it may be difficult to obtain satisfactory gas barrier properties. Meanwhile, even when the film thickness exceeds 800 nm such that the inorganic thin film layer is excessively thickened, the gas barrier properties improving effect equivalent to this thickness is not obtained, and such a film thickness is rather disadvantageous in terms of flex resistance and production cost.

The method for forming the inorganic thin film layer is not particularly limited, and known vapor deposition methods, for example, physical vapor deposition methods (PVD methods) such as a vacuum vapor deposition method, a sputtering method, and an ion plating method, or chemical vapor deposition methods (CVD methods) may be adopted as appropriate. Hereinafter, a typical method for forming the inorganic thin film layer will be described by taking a silicon oxide-aluminum oxide based thin film as an example. For example, in the ease of adopting a vacuum vapor deposition method, a mixture of $SiO_2$ and $Al_2O_3$, or a mixture of $SiO_2$ and Al, or the like is preferably used as a vapor deposition raw material. Normally, particles are used as these vapor deposition raw materials. In this case, the size of each particle is desirably a size that does not change the pressure during vapor deposition, and a preferable particle size is 1 mm to 5 mm. For heating, systems such as resistive heating, high frequency induction heating, electron beam heating, and laser heating can be adopted. It is also possible to adopt reactive vapor deposition in which oxygen, nitrogen, hydrogen, argon, carbon dioxide gas, or water vapor or the like is introduced as a reaction gas or a means such as ozone addition or ion assist is used. Furthermore, film production conditions such as applying a bias to a body to be vapor-deposited (laminated film to be vapor-deposited) and heating or cooling the body to be vapor-deposited can also be arbitrarily changed. Similarly, the vapor deposition materials, the reaction gases, the application of a bias to the body to be vapor-deposited, and the heating/cooling and the like can be changed even when a sputtering method or a CVD method is adopted.

[Protective Layer]

In the present invention, a protective layer is laminated on the inorganic thin film layer. The inorganic thin film layer is not completely a dense film, and may have dotted microscopic deficient moieties. By applying, onto the inorganic thin film layer, a specific resin composition for protective layer, that will be described later to form the protective layer, a resin in the resin composition for protective layer invades the deficient moieties of the inorganic thin film layer, which accordingly provides an effect of stabilizing the gas barrier properties of the laminated layer. Additionally, by using a material having gas barrier properties in the protective layer itself, the laminated film is also largely improved in gas barrier performance.

Examples of the protective layer formed on the surface of the inorganic thin film layer in the present invention include protective layers obtained by adding curing agents such as epoxy-based curing agents, isocyanate-based curing agents, and melamine-based curing agents to resins such as urethane-based resins, polyester-based resins, acrylic-based resins, titanium-based resins, isocyanate-based resins, imine-based resins, and polybutadiene-based resins. Examples of the solvating medium (also referred to as a solvent) include aromatic solvents such as benzene and toluene; alcohol-based solvents such as methanol and ethanol; ketone-based solvents such as acetone and methyl ethyl ketone; ester-based solvents such as ethyl acetate and butyl acetate; and polyhydric alcohol derivatives such as ethylene glycol monomethyl ether.

In the urethane-based resin, polar groups of the urethane bonds interact with the inorganic thin film layer, and further the urethane-based resin also has flexibility by the presence of its amorphous portions, so that the inorganic thin film layer can be restrained from being damaged also when flexing-load is applied to the laminated film, which is preferable. The acid value of the urethane-based resin preferably ranges from 10 to 60 mgKOH/g. The acid value more preferably ranges from 15 to 55 mgKOH/g, and still more preferably 20 to 50 mgKOH/g. When the acid value of the urethane-based resin is in any one of these ranges, the resin is improved in liquid stability when made into a water-dispersible liquid. The protective layer can be evenly deposited onto the inorganic thin film having high polarity, whereby the external appearance of the coat becomes good.

The glass transition temperature (Tg) of the urethane-based resin is preferably 80° C. or higher, and more preferably 90° C. or higher. When the Tg is set to 80° C. or higher, the swelling of the protective layer based on molecular movement can be decreased in a heat-moisture treatment process (temperature raising-temperature keeping-temperature lowering).

From the viewpoint of improving the gas barrier properties thereof, it is more preferable to use a urethane-based resin containing, as a main constituent component, an aromatic or aromatic-aliphatic diisocyanate component. Among these, it is particularly preferable that the urethane-based resin contains a metaxylylene diisocyanate component. The use of the resin allows an effect of stacking between its aromatic rings to further increase the cohesive force of the urethane bonds. Consequently, the laminated film has good gas barrier properties.

In the present invention, the proportion of the aromatic or aromatic-aliphatic diisocyanate in the urethane-based resin is preferably set to 50 mol % or more (50 to 100 mol %) in 100 mol % of the polyisocyanate component. The total proportion of the aromatic or aromatic-aliphatic diisocyanate(s) is preferably 60 to 100 mol %, more preferably 70 to 100 mol %, and still more preferably 80 to 100 mol %. As such resins, "TAKELAC (registered trademark) WPB" series commercially available from Mitsui Chemicals, Inc. can be suitably used. If the total proportion of the aromatic or aromatic-aliphatic diisocyanate(s) is less than 50 mol %, the laminated film may not have good gas barrier properties.

The urethane-based resin preferably has a carboxylic acid group (carboxyl group) from the viewpoint of improving the affinity of the protective layer with the inorganic thin film layer. In order to introduce a carboxylic acid (salt) group into the urethane-based resin, it is advisable to introduce thereinto the following, for example, as a polyol component: a polyol compound having a carboxylic acid group, such as dimethylolpropionic acid or dimethylolbutanoic acid, as a copolymerizable component. When a carboxyl group-containing urethane resin is synthesized, and the reaction system is then neutralized with a salt-forming agent, a urethane resin of a water-dispersible product can be provided. Specific examples of the salt-forming agent include trialkylamines such as ammonia, trimethylamine, triethylamine, triisopropylamine, tri-n-propylamine, and tri-n-butylamine; N-alkylmorpholines such as N-methylmorpholine and N-ethylmorpholine; and N-dialkylalkanolamines such as N-dimethylethanolamine and N-diethylethanolamine. These compounds may be used alone or in combination of two or more thereof.

[Polyolefin Film Sealant Layer]

A polyolefin film sealant layer in the present invention may sufficiently exhibit sealant adhesiveness, and polyethylene resins such as HDPE, LDPE, and LLDPE, polypropylene resins, ethylene-vinyl acetate copolymers, ethylene-α-olefin random copolymers, and ionomer resins and the like can be used. Among them, as polymers having heat resistance to retorting, polypropylene resins are preferable. The polyolefin film sealant layer is normally provided on the protective layer, but it may be provided on the outer side of the biaxially stretched PBT film layer (a surface opposite to the surface on which the adhesion layer is formed). The polyolefin film sealant layer is formed by an extrusion laminate method or a dry laminate method or the like.

The lower limit of the thickness of the polyolefin film sealant layer is preferably 10 μm, more preferably 15 μm, and still more preferably 20 μm. If the thickness of the polyolefin film sealant layer is less than 10 μm, the sealing strength of the packaging bag may be insufficient. The upper limit of the film thickness is preferably 100 μm, more preferably 90 μm, and still more preferably 80 μm. If the film thickness exceeds 100 μm, the film becomes too thick, which is economically disadvantageous, and processability and productivity during bag making may be deteriorated.

In the laminated body obtained by laminating the biaxially stretched PBT film layer and the polyolefin film sealant layer in the present invention, a thermoplastic film may be further laminated on the surface opposite to the sealant layer side of the biaxially stretched PBT film layer. Examples of the thermoplastic film include a biaxially stretched PET film, a biaxially stretched polyethylene naphthalate film, and a biaxially stretched polyamide film.

When a conventional PBT film having an inorganic deposition layer laminated thereon is used according to the above configuration, the inorganic deposition layer has excellent gas barrier properties, and thus there is a possibility that THF and 1,4-butanediol that are generated from the inside of the biaxially stretched PBT film do not come out of the bag, resulting in an increase in the amounts of THF and 1,4-butanediol that transfer to contents in the bag. Meanwhile, in the biaxially stretched PBT film of the present invention, the amount of 1,4-butanediol and THF generated in retorting is also small. Thus, when the biaxially stretched PBT film is used with such a configuration, the amounts of 1,4-butanediol and THF that transfer to contents even after retorting is considered to be able to be reduced.

In the packaging bag of the present invention, the total amount of 1,4-butanediol and THF that transfer into a bag after heating at a temperature of 135° C. for 60 minutes is 1000 ppb or less. The total amount is more preferably 800 ppb or less.

EXAMPLES

Hereinafter, the present invention will be described in more detail by way of Examples, but is not limited to the examples described below. A biaxially stretched PBT film, a laminated body, and a packaging bag were evaluated by the following measurement methods.

[Thickness of Biaxially Stretched PBT Film]

The thickness of a biaxially stretched PBT film was measured according to the A method in JIS K7130-1999 using a dial gauge.

[Thickness Accuracy of Biaxially Stretched PBT Film (Tv (%))]

A film piece was cut out in the MD direction from a center portion of an obtained film roll, and thicknesses were measured at 100 locations on the film piece at pitches of 5 cm using a dial gauge. Then, where a maximum thickness was denoted by T max, a minimum thickness was denoted by T min, and an average thickness was denoted by Tave, the thickness accuracy (Tv) was obtained by the equation (1) below.

$$Tv(\%)=\{(T\max-T\min)/Tave\}\times 100(\%) \quad (1)$$

[Thermal Shrinkage of Biaxially Stretched PBT Film]

The thermal shrinkage of a polyester film was measured by the dimensional change testing method described in JIS-C-2151-2006.21, except that a test temperature was set to 150° C. and a heating time was set to 30 minutes. A test piece was used according to the description at 21.1(a).

[Plane Orientation Coefficient of Biaxially Stretched PBT Film]

Ten specimens were sampled from each rolled sample in the transverse direction. According to JIS K 7142-1996 5.1 (A method), a refractive index in a film longitudinal direction (nx), a refractive index in a transverse direction (ny), and a refractive index in a thickness direction (nz) were measured for each specimen by using sodium D-ray as a light source and Abbe's refractometer and a plane orientation coefficient (ΔP) was calculated according to the equation below. The average value of the measured plane orientation coefficients was employed as the plane orientation coefficient.

$$\Delta P=(nx+ny)/2-nz$$

[Impact Strength of Biaxially Stretched PBT Film (Impact Strength)]

The strength of the film in an environment at 23° C. against impact punching was measured according to JIS K7160-1996 using an impact tester manufactured by TOYO SEIKI SEISAKU-SHO, LTD. As an impact sphere, a sphere with a diameter of ½ inches was used. The unit is J/μm.

[Piercing Strength of Biaxially Stretched PBT Film]

The piercing strength was measured according to "2. Testing methods for strength, etc." in "Standards for food, additives, etc. Chapter III: Apparatus and Containers and Packaging" (Notification No. 20 of the Ministry of Health and Welfare, 1982) in the Food Hygiene Act. The film was stuck with a needle having a tip diameter of 0.7 mm at a sticking speed of 50 mm/minute, and the strength when the needle penetrated the film was measured and regarded as the piercing strength. The measurement was performed at normal temperature (23° C.), and the unit is N.

[Amount of Low-Molecular-Weight Component Generated from Inside of Biaxially Stretched PBT Film]

A method for measuring the amount of a low-molecular-weight component (1,4-butanediol and THF) generated from the inside of an obtained film will be described below.

20 mg of an obtained film was put into a heating/desorption device (MSTD-258M, manufactured by GL Sciences Inc.). A gas component volatilized during heating at a temperature of 135° C. for 60 minutes was collected with a collection pipe and introduced to a concentration/introduction device (CP-4020, manufactured by GL Sciences Inc.). Then, a TIC chromatogram of the generated gas was obtained using a gas chromatograph-mass spectrometer.

Device: HP-7890/HP-5975 (Agilent)
Column: Rxi-1ms (length: 30 ms, inner diameter: 0.25 mm, film thickness: 1.0 μm)
Inlet temperature: 250° C.
Oven temperature: 50° C. (2 minutes), 10° C./min, 250° C. (2 minutes)
Column flow rate: 1 mL/min, Split ratio: 20

Component concentrations were obtained at peak intensities attributed to 1,4-butanediol and THF in the above TIC chromatogram of the sample on the basis of a calibration curve showing a relationship between the respective component concentrations and peak intensities obtained in advance from TIC chromatograms of known amounts of 1,4-butanediol and THF.

The laminated body obtained laminating the biaxially stretched PBT film layer and the polyolefin film sealant layer was evaluated by the following measuring method.

[Oxygen Permeability of Laminated Body]

The oxygen permeability was measured in accordance with the method prescribed in JIS K7126-2A using an oxygen transmittance measurement device ("OX-TRAN 2/21" manufactured by MOCON Inc.) under the conditions of 23° C. and 65% RH. In the measurement, the inorganic compound thin film surface was deemed as an oxygen gas side. The oxygen permeability was also measured after retorting at 135° C. for 1 hour by a retorting machine.

[Water Vapor Permeability of Laminated Body]

The water vapor permeability was measured in accordance with the method prescribed in JIS K7129 B using a water vapor permeability measurement device ("PERMATRAN-W 3/31" manufactured by MOCON Inc.) under the conditions of 40° C. and 90% RH. In the measurement, the inorganic compound thin film surface was deemed as a high-humidity side. The oxygen permeability was also measured after retorting at 135° C. for 1 hour by a retorting machine.

[Pinhole Resistance of Laminated Body]

The laminated body was cut in a size of 20.3 cm (8 inches)×27.9 cm (11 inches), and the obtained rectangular test film after the cutting was left to stand for 24 hours or more under the conditions of a temperature of 23° C. and a relative humidity of 50% for conditioning. Thereafter, the rectangular test film is rolled into a cylindrical shape with a length of 20.32 cm (8 inches). Then, one end of the cylindrical film was fixed to the outer circumference of a disk-shaped fixed head of a Gelbo flex tester (NO. 901 Model, manufactured by Rigaku Industrial Corporation) (according to the standard of MIL-B-131 C). The other end of the cylindrical film was fixed to the outer circumference of a disk-shaped movable head, of the tester, which was set opposite to the fixed head at an interval of 17.8 cm (7 inches). A bending test was performed by continuously repeating 1000 cycles at a speed of 40 cycles/min, each of which was carried out by rotating the movable head by 440° while moving the movable head closer to the fixed head by 7.6 cm (3.5 inches) along the axis of both heads set opposite to each other in parallel, subsequently moving the movable head straight by 6.4 cm (2.5 inches) without rotating the movable head, and executing these movements reversely to return the movable head back to the initial position. The test was performed at −5° C. Thereafter, the number of pinholes generated in a portion of the tested film of 17.8 cm (7 inches)×27.9 cm (11 inches) excluding the parts fixed to the outer circumferences of the fixed head and the movable head was measured (that is, the number of pinholes generated in 497 cm² (77 square inches) was measured).

Good: 5 or less
Average: 5 to 20
Poor: 20 or more

The packaging bag was evaluated by the following measurement methods.

[Bag Breakage Resistance of Packaging Bag]

The laminated body was cut into the size of a 15 cm square. Two cut pieces were laminated such that the sealant was located at the inner side, and three sides of the resultant laminated body were heat-sealed at a sealing temperature of 160° C. and a sealing width of 1.0 cm, to obtain a three-side-sealed bag having internal dimensions of 13 cm. The obtained three-side-sealed bag was filled with 250 mL of water, and the fourth side thereof was closed by heat-sealing, to prepare a four-side-sealed bag filled with water. The obtained four-side-sealed bag was dropped from a position having a height of 100 cm onto a concrete plate in an environment having a room temperature of −5° C., and the number of drops until breakage or until a pinhole occurred was counted.

[Amounts of Low-Molecular-Weight Component (1,4-Butanediol and THF) that Transfers into Packaging Bag]

A method for measuring the amount of the low-molecular-weight component that transfers into the packaging bag will be shown below. The laminated body was cut into the size of a 15 cm square. Two cut pieces were laminated such that the sealant was located at the inner side, and three sides of the resultant laminated body were heat-sealed at a sealing temperature of 160° C. and a sealing width of 1.0 cm, to obtain a three-side-sealed bag having internal dimensions of 13 cm. The three-side sealed bag was heated at 135° C. for 60 minutes, and 0.2 mL of a gas inside the bag was then sucked and collected using a gas tight syringe. A TIC chromatogram of the generated gas was obtained using a gas chromatograph mass spectrometer as described above. Component concentrations were obtained at peak intensities attributed to 1,4-butanediol and THF.

[Aroma Retention Properties of Packaging Bag]

The evaluation method of the aroma retention properties of the packaging bag will be shown below. The two laminated films cut into the size of a 15 cm square were laminated such that the polyolefin film sealant layer was located at the inner side, and three sides of the resultant laminated body were heat-sealed at a sealing temperature of 160° C. and a sealing width of 1.0 cm, to obtain a three-side-sealed bag having internal dimensions of 13 cm. The obtained three-side-sealed bag was filled with ion exchanged water, and retorting was then performed at 135° C. for 1 hour using a retorting machine. Hereafter, the bag was kept at 80° C. for 1 week. 30 panelists conducted a sampling test by drinking using the immersion liquid and made a comparison with ion exchanged water for comparison. The case where the number of persons who felt that the taste was changed as compared to the ion exchanged water for comparison was 3 or less among the 30 persons was determined as Good; the case where the number of persons was 4 to 10 was determined as Average; and the case where the number of persons was 11 or more was determined as Poor.

Raw material resins used in Examples and Comparative Examples will be shown below.

[Raw Material Resins Used for Preparing Biaxially Stretched PBT Film]

(PBT Resin)

1100-211XG (CHANG CHUN PLASTICS CO., LTD., intrinsic viscosity: 1.28 dl/g) was used as a PBT resin that was a main raw material.

(PET Resin)

A PET resin manufactured by Toyobo Co., Ltd. and having an intrinsic viscosity of 0.62 dl/g (measured with a mixed solvating medium of phenol/tetrachloroethane=60/40 at 30° C.) was used.

Example 1-1

[Preparation of Biaxially Stretched PBT Film]

A mixture obtained by blending 80 parts by mass of a PBT resin, 20 parts by mass of a PET resin containing terephthalic acid and ethylene glycol such that the ratio thereof was terephthalic acid/ethylene glycol=100/100 (mol %) and having an intrinsic viscosity of 0.62 dl/g, and porous silica particles having an average particle size of 2.4 μm as inactive particles such that the silica concentration was 1600 ppm was melted using a single axis extruder, and the melt line was then introduced into a static mixer having 12 elements. Accordingly, the PBT resin melted body was divided and laminated to obtain a multi-layer melted body formed of the same raw material. The melted body was cast from a T-die at 265° C. and brought into close contact with a cooling roll at 15° C. by an electrostatic adhesion method to obtain an un-stretched sheet.

Next, the un-stretched sheet was subjected to 3.0 times roll stretching at 70° C. in the machine direction (MD) and then subjected to 4.0 times stretching at 90° C. in the transverse direction (TD) by passing the sheet through a tenter. The sheet was subjected to a heat treatment under tension at 205° C. for 3 seconds and to a relaxation treatment by 1% for 1 second. Thereafter, gripping parts at both ends were cut and removed by 10% each to obtain a mill roll of a biaxially stretched PBT film having a thickness of 15 μm.

[Formation of Inorganic Thin Film Layer]

A complex oxide layer of silicon dioxide and aluminum oxide was formed as an inorganic thin film layer on the obtained biaxially stretched PBT film by an electron beam vapor deposition method. Particulate $SiO_2$ (purity: 99.9%) and $Al_2O_3$ (purity: 99.9%) having a size of about 3 mm to 5 mm were used as a vapor deposition source. The film thickness of the inorganic thin film layer ($SiO_2/Al_2O_3$ complex oxide layer) in the film (inorganic thin film layer/coating layer-containing film) obtained as described above was 13 nm. The composition of the complex oxide layer was $SiO_2/Al_2O_3$ (mass ratio)=60/40.

[Preparation of Packaging Bag]

A non-stretched polypropylene film ("P1147", manufactured by Toyobo Co., Ltd.) having a thickness of 70 μm was attached as a polyolefin sealant layer onto the inorganic thin film layer of the biaxially stretched PBT film by a dry laminate method using a urethane-based two-component curing type adhesive (obtained by blending "Takelac (registered trademark) A525S" and "Takenate (registered trademark) A50", manufactured by Mitsui Chemicals Inc., at a ratio of 13.5:1 (mass ratio)), and the resultant laminated body was subjected to aging at 40° C. for 4 days to obtain a laminated body. The two laminated bodies cut into the size of a 15 cm square were laminated such that the sealant layer was located at the inner side, and three sides of the resultant laminated body were heat-sealed at a sealing temperature of 160° C. and a sealing width of 1.0 cm, to obtain a three-side-sealed bag having internal dimensions of 13 cm. Table 1 showed the film production conditions and physical properties of the biaxially stretched PBT film, the physical properties of the laminated body, and the evaluation results of the packaging bag.

TABLE 1

| | | | Unit | Example 1-1 | Example 1-2 | Example 1-3 | Example 1-4 | Comparative Example 1-1 | Comparative Example 1-2 | Comparative Example 1-3 |
|---|---|---|---|---|---|---|---|---|---|---|
| Raw materials | Resin | PBT | % by mass | 80 | 80 | 75 | 90 | 55 | 80 | 70 |
| | | PET | % by mass | 20 | 20 | 25 | 10 | 45 | 20 | 30 |
| Film production conditions of PBT film | Extrusion temperature | | ° C. | 265 | 270 | 265 | 265 | 265 | 265 | 290 |
| | Temperature of cooling roll | | ° C. | 20 | 20 | 20 | 20 | 20 | 20 | 20 |
| | MD stretching temperature | | ° C. | 70 | 70 | 70 | 70 | 70 | 70 | 70 |
| | MD stretching ratio | | Times | 3 | 3 | 3 | 3 | 2.9 | 2.5 | 3 |
| | TD stretching temperature | | ° C. | 90 | 90 | 90 | 90 | 90 | 90 | 90 |
| | TD stretching ratio | | Times | 4 | 4 | 4 | 4 | 4 | 3 | 4 |
| | Thermo-setting temperature | | ° C. | 205 | 205 | 205 | 210 | 205 | 205 | 190 |
| Physical properties of PBT film | Thickness | | μm | 15 | 15 | 15 | 15 | 15 | 15 | 15 |
| | Thickness accuracy | | % | 7 | 8 | 7 | 7 | 6 | 17 | 8 |
| | MD thermal shrinkage | 150° C. × 30 min. | % | 1.00 | 0.95 | 0.94 | 0.61 | 0.84 | 0.80 | 2.11 |
| | TD thermal shrinkage | 150° C. × 30 min. | % | 1.45 | 1.45 | 1.45 | 1.37 | 1.41 | 1.45 | 2.06 |
| | Plane orientation coefficient | | — | 0.145 | 0.145 | 0.143 | 0.146 | 0.137 | 0.082 | 0.143 |
| | Impact strength | | J/μm | 0.062 | 0.061 | 0.060 | 0.063 | 0.049 | 0.040 | 0.52 |
| | Piercing strength | | N/μm | 0.95 | 0.94 | 0.94 | 0.99 | 0.86 | 0.39 | 0.84 |
| | Amount of low-molecular-weight component generated | THF | ppb | 57 | 60 | 54 | 63 | 40 | 58 | 105 |
| | | 1,4-butanediol | ppb | 1495 | 1545 | 1400 | 1654 | 1030 | 1500 | 2133 |
| | | Total | ppb | 1552 | 1605 | 1453 | 1717 | 1070 | 1558 | 2238 |
| Physical properties of laminated body | Gas barrier properties | Normal state Oxygen permeability | ml/m² · day · MPa | 10 | 10 | 10 | 10 | 9 | 13 | 13 |
| | | Water vapor permeability | g/m² · day | 2 | 2 | 2 | 2 | 2 | 2 | 3 |
| | | After retorting Oxygen permeability | ml/m² · day · MPa | 13 | 13 | 12 | 11 | 12 | 17 | 20 |
| | | Water vapor permeability | g/m² · day | 6 | 6 | 6 | 6 | 5 | 7 | 7 |
| | Pinhole resistance | | Number | 4 | 5 | 6 | 4 | 17 | 9 | 23 |
| Evaluaton of packaging bag | Bag breakage resistance | | Times | 56 | 49 | 47 | 50 | 25 | 32 | 32 |
| | Amount of low molecular-weight component generated | THF | ppb | 30 | 31 | 28 | 30 | 25 | 31 | 54 |
| | | 1,4-butanediol | ppb | 745 | 770 | 700 | 817 | 520 | 755 | 1113 |
| | | Total | ppb | 775 | 801 | 728 | 847 | 595 | 786 | 1166 |
| | Aroma retention properties | | — | Good | Good | Good | Good | Good | Good | Average |

Examples 1-2 to 1-4, Comparative Examples 1-1 to 1-3

A mill roll of a biaxially stretched PBT film was obtained in the same manner as in Example 1 except that the biaxially stretched PBT film was prepared under conditions described in Table 1 for raw material compositions and film production conditions, and an inorganic thin film layer was formed thereon. Then, a polyolefin sealant film layer was laminated thereon to prepare a packaging bag. The packaging bag was evaluated.

As shown in Table 1, the packaging bags of Examples 1-1 to 1-4 had excellent bag breakage resistance, a small amount of a low-molecular-weight component that transferred, and good aroma retention properties. The laminated body used has excellent oxygen barrier properties and water vapor barrier properties even after retorting, and simultaneously has excellent pinhole resistance, whereby the packaging bag also can be expected to have excellent oxygen barrier properties, water vapor barrier properties, and pinhole resistance after retorting.

Meanwhile, in Comparative Example 1-1, the content of PBT in the biaxially stretched PBT film layer was small, which caused decreased impact strength, piercing strength, and pinhole resistance of the biaxially stretched PBT film, so that the bag breakage resistance of the packaging bag was insufficient.

As shown in Comparative Example 1-2, when the stretching ratio was low, the plane orientation of the biaxially stretched PBT film layer was not increased, and thus the impact strength, the piercing resistance, and the thickness accuracy of the biaxially stretched PBT film layer were deteriorated, so that the packaging bag also had insufficient bag breakage resistance.

As shown in Comparative Example 1-3, when the extrusion temperature during film production is high, the amount of a low-molecular-weight component in the biaxially stretched PBT film layer increases due to pyrolysis of the resin, and thus the amount of the low-molecular-weight component generated after heating of the film increases.

The thermo-setting treatment temperature during film production is low, and thus a low-molecular-weight component generated in the extrusion step cannot be sufficiently removed, so that the amount of the low-molecular-weight component generated from the film increases. Therefore, the packaging bag had a large amount of a low-molecular-weight component that transferred, and poor aroma retention properties.

Example 1-5

Using the laminated body prepared in Example 1-1, a pouch (length: 170 mm, width: 120 mm, heel height: 25 mm) was prepared. The pouch was filled with 100 g of curry roux, and heated in a 500 W microwave oven for 5 minutes. As a result, all ten bags (n=10) could be suitably used without being perforated. It has been known that, when a biaxially stretched polyamide film is used in place of the layer of biaxially stretched polybutylene terephthalate film of the packaging bag of the present invention, the packaging bag may be perforated.

Example 1-6

A non-stretched linear low density polyethylene (LLDPE) film ("L6100" manufactured by Toyobo Co., Ltd.) having a thickness of 70 μm was attached as a polyolefin sealant layer onto the inorganic thin film layer of the biaxially stretched PBT film prepared in the same manner as in Example 1-1 by a dry laminate method using a urethane-based two-component curing type adhesive (obtained by blending "Takelac (registered trademark) A525S" and "Takenate (registered trademark) A50", manufactured by Mitsui Chemicals Inc., at a ratio of 13.5:1 (mass ratio)), and the resultant laminated body was subjected to aging at 40° C. for 4 days to obtain a laminated body. The two laminated bodies cut into the size of a 15 cm square were laminated such that the sealant layer was located at the inner side, and three sides of the resultant laminated body were heat-sealed at a sealing temperature of 160° C. and a sealing width of 1.0 cm, to obtain a three-side-sealed bag having internal dimensions of 13 cm. Meat was vacuum-packed by the bag. Similarly, konjak was vacuum-packed by the bag. These could be finely vacuum-packed.

Example 1-7

The roll of the biaxially stretched PBT film prepared in the same manner as in Example 1-1 was set in an extrusion laminating apparatus. A blend film (blend ratio: 6:4, thickness: 40 μm) containing polylactic acid (formed from biomass, TERRAMAC TP-4000 manufactured by UNITIKA LTD.) and low density polyethylene (Z568 manufactured by UBE-MARUZEN POLYETHYLENE Co., Ltd.) was extruded at a resin temperature of 240° C. onto one surface of the biaxially stretched PBT film in a state where an anchor coat agent containing polyethyleneimine was disposed therebetween to obtain a roll of an extruded laminated body. The laminated body roll was set in a vertical pillow packager, and subjected to center sealing to be formed into a tube form. Then, a pillow bag having an outer dimension of 100 mm×150 mm and a back seal width part of 10 mm was prepared. The packaging bag having a good appearance could be prepared.

Example 1-8

A biaxially stretched PBT film was prepared under the same conditions as in Example 1-1. Laminated bodies having the configurations (1) to (6) described below were prepared using the biaxially stretched PBT film. Packaging bags were prepared using the laminated bodies of (1) to (6). The packaging bags having a good appearance could be prepared.

(1) biaxially stretched PBT film layer/polyurethane-based adhesive layer/printing layer/non-stretched polypropylene film sealant layer.

(2) biaxially stretched PBT film layer/inorganic thin film layer/polyurethane-based adhesive layer/printing layer/low density polyethylene/linear low density polyethylene film sealant layer.

(3) Linear low density polyethylene film sealant layer/biaxially stretched PBT film layer/anchor coat layer/inorganic thin film layer/polyurethane-based adhesive layer/linear low density polyethylene film sealant layer.

(4) Linear low density polyethylene film layer/biaxially stretched PBT film layer/anchor coat layer/inorganic thin film layer/polyurethane-based adhesive layer/linear low density polyethylene film layer/paper//linear low density polyethylene film sealant layer.

(5) biaxially stretched PBT film layer/inorganic thin film layer/polyurethane-based adhesive layer/printing layer/non-stretched polypropylene film sealant layer.

(6) Biaxially stretched PET film layer/inorganic thin film layer/adhesive layer/printing layer/biaxially stretched PBT film layer/easy peel type non-stretched polypropylene film sealant layer.

Example 2-1

[Preparation of Biaxially Stretched PBT Film]

A mixture obtained by blending 80 parts by mass of the above PBT resin, 20 parts by mass of the above PET resin, and porous silica particles having an average particle size of 2.4 μm as inert particles such that the silica concentration was set to 1600 ppm was melted using a single axis extruder, and then introduced into a melt line including a static mixer having 12 elements. Accordingly, the PBT resin melted body was divided and subjected to super multi-layer lamination to obtain a multi-layer melted body formed of the same raw material. The multi-layer melted body was cast from a T-die at 265° C., and brought into close contact with a cooling roll at 15° C. by an electrostatic adhesion method to obtain a multi-layer un-stretched sheet formed of the same raw material.

Next, the multi-layer un-stretched sheet formed of the same raw material was subjected to 3.0 times roll stretching at 70° C. in the MD direction. One surface of the obtained uniaxially stretched film was coated with a coating solution 1 below as an adhesion layer by a fountain bar coating method. Then, the sheet was led to a tenter while being dried, and then subjected to 4.0 times stretching at 90° C. in the TD direction. The sheet was subjected to a heat treatment under tension at 205° C. for 3 seconds and to a relaxation treatment of 1% for 1 second. Thereafter, gripping parts at both ends were cut and removed by 10% each to obtain a biaxially stretched PBT film on which an adhesion layer having a thickness of 15 μm was laminated.

[Coating Solution Used for Adhesion Layer]

Materials were mixed at a blending ratio below to prepare an application liquid 1 (resin composition for an adhesion layer).

Water: 54.40% by mass

Isopropanol: 25.00% by mass

Oxazoline group-containing resin (A): 15.00% by mass

Acrylic resin (B): 3.60% by mass

Urethane resin (C): 2.00% by mass

Here, as the oxazoline group-containing resin (A), a commercially available water-soluble oxazoline-group-containing acrylate ("EPOCROS (registered trademark) WS-300", manufactured by Nippon Shokubai Co., Ltd.; solid content: 10%) was used. The oxazoline group amount in this resin was 7.7 mmol/g.

Here, as the acrylic resin (B), a commercially available acrylic ester copolymer emulsion having a concentration of 25% by mass ("MOVINYL (registered trademark) 7980", manufactured by Nichigo-Movinyl Co. Ltd.) was used. This acrylic resin (B) had an acid value (theoretical value) of 4 mgKOH/g.

Here, as the urethane resin (C): urethane-based resin, a commercially available polyester urethane resin dispersion ("TAKELAC (registered trademark) W605", manufactured by Mitsui Chemicals, Inc.: solid content: 30%) was prepared. This urethane resin had an acid value of 25 mgKOH/g, and a glass transition temperature (Tg) of 100° C., which was measured by DSC. The proportion of its aromatic or aromatic-aliphatic diisocyanates was 55 mol % of the whole of its polyisocyanate components, the proportion being measured by $^1$H-NMR.

[Formation of Inorganic Thin Film Layer]

A complex oxide layer of silicon dioxide and aluminum oxide was formed as an inorganic thin film layer on the adhesion layer surface of the obtained biaxially stretched PBT film by an electron beam vapor deposition method. Particulate $SiO_2$ (purity: 99.9%) and $Al_2O_3$ (purity: 99.9%) having a size of about 3 mm to 5 mm were used as a vapor deposition source. The film thickness of the inorganic thin film layer ($SiO_2/Al_2O_3$ complex oxide layer) in the film (inorganic thin film layer/adhesion layer-containing film) obtained as described above was 13 nm. The composition of the complex oxide layer was $SiO_2/Al_2O_3$ (mass ratio)=60/40.

[Formation of Protective Layer]

The inorganic thin film layer formed by vapor deposition was coated with a coating liquid 2 below by a wire bar coating method, followed by drying at 200° C. for 15 seconds, to laminate a protective layer. The coat amount of the layer after drying was 0.190 g/m² (as a solid content).

[Coating Liquid Used for Coating of Protective Layer]

Coating agents below were mixed with each other to prepare a coating liquid 2. Here, the mass ratio of the urethane resin (D) in terms of a solid content is as shown below.

Water: 60.00% by mass

Isopropanol 30.00% by mass

Urethane resin (D): 10.00% by mass

Here, as the urethane resin (D), a commercially available metaxylylene group-containing urethane resin dispersion ("TAKELAC (registered trademark) WPB341", manufactured by Mitsui Chemicals, Inc.; solid content: 30%) was prepared. This urethane resin had an acid value of 25 mgKOH/g, and a glass transition temperature (Tg) of 130° C., which was measured by DSC. The proportion of its aromatic or aromatic-aliphatic diisocyanates was 85 mol % of the whole of its polyisocyanate components, the proportion being measured by 1H-NMR.

As described above, a laminated gas barrier film was prepared by laminating the adhesion layer, the inorganic thin film layer, and the protective layer on the biaxially stretched PBT film.

[Preparation of Polyolefin Sealant Layer laminated Body and Packaging Bag]

A non-stretched polypropylene film ("P1147", manufactured by Toyobo Co., Ltd.) having a thickness of 70 μm was attached as a polyolefin sealant layer onto a protective layer of a gas barrier film in which a biaxially stretched PBT film layer, an adhesion layer, an inorganic thin film layer, and the protective layer were sequentially laminated by a dry laminate method using a urethane-based two-component curing type adhesive (obtained by blending "Takelac (registered trademark) A525S" and "Takenate (registered trademark) A50", manufactured by Mitsui Chemicals Inc., at a ratio of 13.5:1 (mass ratio)), and the resultant laminated body was subjected to aging at 40° C. for 4 days to obtain a laminated body including the gas barrier film and the polyolefin film sealant layer. The two laminated bodies cut into the size of a 15 cm square were laminated such that the sealant layer was located at the inner side, and three sides of the resultant laminated body were heat-sealed at a sealing temperature of 160° C. and a sealing width of 1.0 cm, to obtain a three-side-sealed bag having internal dimensions of 13 cm. Table 2 showed the film production conditions and characteristics of the biaxially stretched PBT film, the characteristics of the laminated body including the laminated gas barrier film and the polyolefin film sealant layer, and the evaluation results of the packaging bag obtained from the laminated body.

Examples 2-2 to 2-4, Comparative Examples 2-1 to 2-3

A biaxially stretched PBT film on which an adhesion layer was laminated was obtained in the same manner as in Example 2-1 except that the biaxially stretched PBT film was prepared under conditions described in Tables 2 and 3 for raw material compositions and film production conditions, and an inorganic thin film layer and a protective layer were sequentially laminated thereon. Then, a polyolefin sealant film layer was laminated thereon to prepare a laminated body. A packaging bag was prepared from the laminated body, and evaluated. Tables 2 and 3 showed the film production conditions and characteristics of the biaxially stretched PBT film, the characteristics of the laminated body including the laminated gas barrier film and the polyolefin film sealant layer, and the evaluation results of the packaging bag obtained from the laminated body.

As shown in Table 2, the packaging bags of Examples 2-1 to 2-4 had excellent bag breakage resistance, small amounts of 1,4-butanediol and THF that were low-molecular-weight components and transferred, and good aroma retention properties. The laminated body used has excellent oxygen barrier properties and water vapor barrier properties even after retorting, and simultaneously has excellent pinhole resistance, whereby the packaging bag also can be expected to have excellent oxygen barrier properties, water vapor barrier properties, and pinhole resistance after retorting.

Meanwhile, as shown in Table 3, in Comparative Example 2-1, the content of PBT in the biaxially stretched PBT film layer was small, which caused decreased impact strength, piercing strength, and pinhole resistance of the biaxially stretched PBT film, so that the bag breakage resistance of the packaging bag was insufficient.

As shown in Comparative Example 2-2, when the stretching ratio was low, the plane orientation of the biaxially stretched PBT film layer was not increased, and thus the impact strength, the piercing resistance, and the thickness accuracy of the biaxially stretched PBT film layer were deteriorated, so that the packaging bag also had insufficient bag breakage resistance.

As shown in Comparative Example 2-3, when the extrusion temperature during film production is high, the amount of a low-molecular-weight component in the biaxially stretched PBT film layer increases due to pyrolysis of the PBT resin, and thus the amount of the low-molecular-weight component generated after heating of the film increases. The thermo-setting treatment temperature during film production is low, and thus a low-molecular-weight component generated in the extrusion step cannot be sufficiently removed, so that the amounts of 1,4-butanediol and THF as low-molecular-weight components generated from the biaxially stretched PBT film layer increase. Therefore, the packaging bag had large amounts of 1,4-butanediol and THF that were low-molecular-weight components and transferred, and poor aroma retention properties.

Comparative Example 2-4

A biaxially stretched PBT film including no adhesion layer laminated was obtained in the same manner as in Example 2-1 except that the adhesion layer and the protective layer were not formed and laminated in Example 2-1. An inorganic thin film layer was laminated thereon. A laminated body was prepared by laminating a polyolefin sealant film layer without forming a protective layer. A packaging bag was prepared from the laminated body, and evaluated. In Comparative Example 2-4, the laminated body included no adhesion layer and protective layer, and thus the laminated body including the gas barrier film and the polyolefin film sealant layer had poor gas barrier properties. The packaging bag prepared from the laminated body had slightly poorer aroma retention properties than those of Example 2-1.

TABLE 2

| | | | Unit | Example 2-1 | Example 2-2 | Example 2-3 | Example 2-4 |
|---|---|---|---|---|---|---|---|
| Raw materials | Resin | PBT | % by mass | 80 | 80 | 75 | 90 |
| | | PET | % by mass | 20 | 20 | 25 | 10 |
| Film production conditions of PBT film | Extrusion temperature | | °C. | 265 | 270 | 265 | 265 |
| | Temperature of cooling roll | | °C. | 20 | 20 | 20 | 20 |
| | MD stretching temperature | | °C. | 70 | 70 | 70 | 70 |
| | MD stretching ratio | | Times | 3 | 3 | 3 | 3 |
| | TD stretching temperature | | °C. | 90 | 90 | 90 | 90 |
| | TD stretching ratio | | Times | 4 | 4 | 4 | 4 |
| | Thermo-setting temperature | | °C. | 205 | 205 | 205 | 210 |
| | Adhesion layer | | — | Adhesion layer 1 | Adhesion layer 1 | Adhesion layer 1 | Adhesion layer 1 |
| | Inorganic thin film layer | | — | Inorganic thin film layer 1 | Inorganic thin film layer 1 | Inorganic thin film layer 1 | Inorganic thin film layer 1 |
| | Protective layer | | — | Protective layer 1 | Protective layer 1 | Protective layer 1 | Protective layer 1 |
| Characteristics of PBT film | Thickness | | μm | 15 | 15 | 15 | 15 |
| | Thickness accuracy | | % | 7 | 8 | 7 | 7 |
| | MD thermal shrinkage | 150° C. × 30 min. | % | 1.00 | 0.95 | 0.94 | 0.61 |
| | TD thermal shrinkage | 150° C. × 30 min. | % | 1.45 | 1.45 | 1.45 | 1.37 |
| | Plane orientation coefficient | | — | 0.145 | 0.145 | 0.143 | 0.146 |
| | Impact strength | | J/μm | 0.062 | 0.061 | 0.060 | 0.063 |
| | Piercing strength | | N/μm | 0.95 | 0.94 | 0.94 | 0.99 |
| | Amount of low-molecular-weight component generated | THF | ppb | 57 | 60 | 54 | 63 |
| | | 1,4-butanediol | ppb | 1495 | 1545 | 1400 | 1654 |
| | | Total | ppb | 1552 | 1605 | 1453 | 1717 |
| Physical characteristics of laminated body | Gas barrier properties | Normal state | Oxygen permeability | ml/m² · day · MPa | 6.1 | 6.4 | 6.1 | 6.4 |
| | | | Water vapor permeability | g/m² · day | 1.3 | 1.4 | 1.3 | 1.2 |
| | | After retorting | Oxygen permeability | ml/m² · day · MPa | 6.7 | 7.0 | 6.7 | 7.0 |
| | | | Water vapor permeability | g/m² · day | 1.6 | 1.7 | 1.6 | 1.5 |
| | Pinhole resistance | | Number | 4 | 5 | 6 | 4 |

TABLE 2-continued

|  |  |  | Unit | Example 2-1 | Example 2-2 | Example 2-3 | Example 2-4 |
| --- | --- | --- | --- | --- | --- | --- | --- |
| Evaluaton of packaging bag | Bag breakage resistance |  | Times | 56 | 49 | 47 | 50 |
|  | Amount of low molecular-weight component generated | THF | ppb | 24 | 25 | 22 | 24 |
|  |  | 1,4-butanediol | ppb | 596 | 616 | 560 | 654 |
|  |  | Total | ppb | 620 | 641 | 582 | 678 |
|  | Aroma retention properties |  | — | Good | Good | Good | Good |

TABLE 3

|  |  |  | Unit | Example 2-1 | Example 2-2 | Example 2-3 | Example 2-4 |
| --- | --- | --- | --- | --- | --- | --- | --- |
| Raw materials | Resin | PBT | % by mass | 55 | 80 | 70 | 80 |
|  |  | PET | % by mass | 45 | 20 | 30 | 20 |
| Film production conditions of PBT film | Extrusion temperature |  | ° C. | 265 | 265 | 290 | 265 |
|  | Temperature of cooling roll |  | ° C. | 20 | 20 | 20 | 20 |
|  | MD stretching temperature |  | ° C. | 70 | 70 | 70 | 70 |
|  | MD stretching ratio |  | Times | 2.9 | 2.5 | 3 | 3 |
|  | TD stretching temperature |  | ° C. | 90 | 90 | 90 | 90 |
|  | TD stretching ratio |  | Times | 4 | 4 | 4 | 4 |
|  | Thermo-setting temperature |  | ° C. | 205 | 205 | 205 | 210 |
|  | Adhesion layer |  | — | Adhesion layer 1 | Adhesion layer 1 | Adhesion layer 1 | Adhesion layer 1 |
|  | Inorganic thin film layer |  | — | Inorganic thin film layer 1 | Inorganic thin film layer 1 | Inorganic thin film layer 1 | Inorganic thin film layer 1 |
|  | Protective layer |  | — | Protective layer 1 | Protective layer 1 | Protective layer 1 | — |
| Characteristics of PBT film | Thickness |  | μm | 15 | 15 | 15 | 15 |
|  | Thickness accuracy |  | % | 6 | 17 | 8 | 7 |
|  | MD thermal shrinkage | 150° C. × 30 min. | % | 0.84 | 0.80 | 2.11 | 1.00 |
|  | TD thermal shrinkage | 150° C. × 30 min. | % | 1.41 | 1.45 | 2.06 | 1.45 |
|  | Plane orientation coefficient |  | — | 0.137 | 0.082 | 0.143 | 0.145 |
|  | Impact strength |  | J/μm | 0.049 | 0.040 | 0.052 | 0.062 |
|  | Piercing strength |  | N/μm | 0.86 | 0.39 | 0.84 | 0.95 |
|  | Amount of low-molecular-weight component generated | THF | ppb | 40 | 58 | 105 | 57 |
|  |  | 1,4-butanediol | ppb | 1030 | 1500 | 2133 | 1495 |
|  |  | Total | ppb | 1070 | 1558 | 2238 | 1552 |
| Physical characteristics of laminated body | Gas barrier properties | Normal state | Oxygen permeability | ml/m² · day · MPa | 5.8 | 8.3 | 8.3 | 10.0 |
|  |  |  | Water vapor permeability | g/m² · day | 1.3 | 1.5 | 1.7 | 2.0 |
|  |  | After retorting | Oxygen permeability | ml/m² · day · MPa | 6.3 | 9.2 | 9.2 | 13.0 |
|  |  |  | Water vapor permeability | g/m² · day | 1.6 | 1.8 | 2.0 | 6.0 |
|  | Pinhole resistance |  | Number | 17 | 9 | 23 | 4 |
| Evaluaton of packaging bag | Bag breakage resistance |  | Times | 25 | 32 | 32 | 56 |
|  | Amount of low molecular-weight component generated | THF | ppb | 20 | 25 | 43 | 30 |
|  |  | 1,4-butanediol | ppb | 416 | 604 | 890 | 745 |
|  |  | Total | ppb | 436 | 629 | 934 | 775 |
|  | Aroma retention properties |  | — | Good | Good | Average | Good |

Example 2-5

Using the laminated body prepared in Example 2-1, a pouch (length: 170 mm, width: 120 mm, heel height: 25 mm) was prepared. The pouch was filled with 100 g of curry roux, and heated in a 500 W microwave oven for 5 minutes. As a result, all ten bags (n=10) could be suitably used without being perforated. It has been known that, when the biaxially stretched polyamide film is used in place of the biaxially stretched PBT film layer of the packaging bag of the present invention, the packaging bag may be perforated.

Example 2-6

A non-stretched linear low density polyethylene (LLDPE) film ("L6100" manufactured by Toyobo Co., Ltd.) having a thickness of 70 μm was attached as a polyolefin sealant layer onto the inorganic thin film layer of the biaxially stretched PBT film produced in the same manner as in Example 2-1 by a dry laminate method using a urethane-based two-component curing type adhesive (obtained by blending "Takelac (registered trademark) A525S" and "Takenate (registered trademark) A50", manufactured by Mitsui Chemicals Inc., at a ratio of 13.5:1 (mass ratio)), and the resultant laminated body was subjected to aging at 40° C. for 4 days to obtain a laminated body. The two laminated bodies cut into the size of a 15 cm square were laminated such that the sealant layer was located at the inner side, and three sides of the resultant laminated body were heat-sealed at a sealing temperature of 160° C. and a sealing width of 1.0 cm, to obtain a three-side-sealed bag having internal dimensions of 13 cm. Meat was vacuum-packed by the bag. Similarly, konjak was vacuum-packed by the bag. These could be finely vacuum-packed.

Example 2-7

The roll of the biaxially stretched PBT film prepared in the same manner as in Example 2-1 was set in an extrusion laminating apparatus. A blend film (blend ratio: 6:4, thickness: 40 μm) containing polylactic acid (formed from biomass, TERRAMAC (registered trademark) TP-4000 manufactured by UNITIKA LTD.) and low density polyethylene (Z568 manufactured by UBE-MARUZEN POLYETHYLENE Co., Ltd.) was extruded at a resin temperature of 240° C. onto one surface of the biaxially stretched PBT film in a state where an anchor coat agent containing polyethyleneimine was disposed therebetween to obtain a roll of an extruded laminated body. The laminated body roll was set in a vertical pillow packager, and subjected to center sealing to be formed into a tube form. Then, a pillow bag having an outer dimension of 100 mm×150 mm and a back seal width part of 10 mm was prepared.

Example 2-8

A biaxially stretched PBT film was prepared under the same conditions as in Example 2-1. Laminated bodies having the configurations (1) to (5) described below were prepared using the biaxially stretched PBT film. Packaging bags were prepared using the laminated bodies of (1) to (5). The packaging bags having a good appearance could be prepared.

(1) biaxially stretched PBT film layer/adhesion layer/inorganic thin film layer/protective layer/polyurethane-based adhesive layer/printing layer/low density polyethylene/linear low density polyethylene film sealant layer.

(2) Linear low density polyethylene film sealant layer/biaxially stretched PBT film layer/adhesion layer/inorganic thin film layer/protective layer/polyurethane-based adhesive layer/linear low density polyethylene film sealant layer.

(3) Linear low density polyethylene film layer/biaxially stretched PBT film layer/adhesion layer/inorganic thin film layer/protective layer/polyurethane-based adhesive layer/linear low density polyethylene film layer/paper/linear low density polyethylene film sealant layer.

(4) biaxially stretched PBT film layer/adhesion layer/inorganic thin film layer/protective layer/polyurethane-based adhesive layer/printing layer/non-stretched polypropylene film sealant layer.

(5) Biaxially stretched PET film layer/adhesion layer/inorganic thin film layer/protective layer/adhesive layer/printing layer/biaxially stretched PBT film layer/easy peel type non-stretched polypropylene film sealant layer.

INDUSTRIAL APPLICABILITY

The present invention can provide a packaging bag that has excellent dimensional stability, processability, bag breakage resistance, chemical resistance, and pinhole resistance at low temperature, causes less transfer of an extract to contents after a heat treatment, and thus the packaging bag can be widely used as a packaging bag suitable for packaging for frozen foods, retorting, or heating with a microwave oven and the like.

The invention claimed is:

1. A packaging bag comprising a laminated body in which a gas barrier film, a polyolefin film sealant layer, and a biaxially stretched polyethylene terephthalate film are laminated,
wherein the gas barrier film is obtained by sequentially laminating a biaxially stretched polybutylene terephthalate film, an adhesion layer, an inorganic thin film layer, and a protective layer,
wherein the biaxially stretched polyethylene terephthalate film is laminated on a surface of the biaxially stretched polybutylene terephthalate film opposite to the polyolefin film sealant layer side of the biaxially stretched polybutylene terephthalate film,
wherein the biaxially stretched polybutylene terephthalate film has a thickness of 8 to 25 μm, the polyolefin film sealant layer has a thickness of 10 to 100 μm, and the protective layer comprises a urethane-based resin, and
wherein the biaxially stretched polybutylene terephthalate film satisfies (a) to (c) below:
(a) the biaxially stretched polybutylene terephthalate film contains 60% by mass or more of a polybutylene terephthalate resin;
(b) a thermal shrinkage of the biaxially stretched polybutylene terephthalate film after heating at 150° C. for 30 minutes is −2 to +4% in both the machine direction and the transverse direction; and
(c) a total amount of 1,4-butanediol and tetrahydrofuran volatilized during heating at a temperature of 135° C. for 60 minutes is 2000 ppb or less.

2. The packaging bag according to claim 1, wherein the polyolefin film sealant layer contains 30 to 80% by mass of low density polyethylene and 20 to 70% by mass of polylactic acid.

3. The packaging bag according to claim 1, wherein the packaging bag is a retort packaging bag.

4. The packaging bag according to claim 1, wherein the packaging bag is used for heating with a microwave oven.

5. The packaging bag according to claim 1, wherein the packaging bag is a vacuum packaging bag.

6. The packaging bag according to claim 1, wherein the packaging bag is a pillow packaging bag.

* * * * *